United States Patent
Van Brocklin et al.

(10) Patent No.: US 7,538,889 B2
(45) Date of Patent: May 26, 2009

(54) CALIBRATION FEEDBACK-CONTROL CIRCUIT FOR DIFFRACTION LIGHT DEVICES

(75) Inventors: Andrew L. Van Brocklin, Corvallis, OR (US); Eric Martin, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1116 days.

(21) Appl. No.: 10/782,488

(22) Filed: Feb. 18, 2004

(65) Prior Publication Data

US 2005/0179912 A1    Aug. 18, 2005

(51) Int. Cl.
G01B 11/02    (2006.01)
G01B 9/02    (2006.01)

(52) U.S. Cl. ............................ 356/506; 356/519
(58) Field of Classification Search ................. 356/519, 356/506, 454
See application file for complete search history.

(56) References Cited

U.S. PATENT DOCUMENTS

| | | | |
|---|---|---|---|
| 5,182,665 A | 1/1993 | O'Callaghan et al. | |
| 5,552,916 A | 9/1996 | O'Callaghan et al. | |
| 5,613,022 A | 3/1997 | Odhner et al. | |
| 6,061,166 A | 5/2000 | Furlani et al. | |
| 6,091,463 A | 7/2000 | Robinson et al. | |
| 6,243,063 B1 | 6/2001 | Mayhew et al. | |
| 6,373,549 B1 | 4/2002 | Tombling et al. | |
| 6,538,748 B1 * | 3/2003 | Tucker et al. | ............... 356/519 |
| 6,707,230 B2 * | 3/2004 | Smith et al. | ............ 310/316.01 |

* cited by examiner

Primary Examiner—Patrick J Connolly

(57) ABSTRACT

A feedback-control circuit for color calibration of a diffraction light device includes at least one diffractive light device (DLD) having a gap distance defined by opposing plates, at least one sensor configured to convert light modulated by the DLD device into a light signal indicative of the gap, a controller configured to calculate a voltage correction value based on a difference between the gap as indicated by the light signal and a designer-specified gap value and being further configured to apply a corrected voltage corresponding to the voltage correction value to the DLD device.

34 Claims, 5 Drawing Sheets

US 7,538,889 B2

CALIBRATION FEEDBACK-CONTROL CIRCUIT FOR DIFFRACTION LIGHT DEVICES

BACKGROUND

Micro-electromechanical systems (MEMS) are systems, which are typically developed using thin film technology and include both electrical and micro-mechanical components. MEMS devices are used in a variety of applications such as optical display systems, pressure sensors, flow sensors, and charge-control actuators. MEMS devices use electrostatic force or energy to move or monitor the movement of micro-mechanical electrodes, which can store charge. In one type of MEMS device, to achieve a desired result, a gap distance between electrodes is controlled by balancing an electrostatic force and a mechanical restoring force.

MEMS devices designed to perform optical functions have been developed using a variety of approaches. According to one approach, a deformable deflective membrane is positioned over an electrode and is electrostatically attracted to the electrode. Other approaches use flaps or beams of silicon or aluminum, which form a top conducting layer. With optical applications, the conducting layer is reflective while the deflective membrane is deformed using electrostatic force to direct light which is incident upon the conducting layer.

More specifically, a group of MEMS called Diffractive Light Devices (DLDs) produce colors based on the precise spacing of a pixel plate relative to lower (and possibly upper) plates. This spacing is the result of a balance of two forces: electro-static attraction based on voltage and charge on the plates, and a spring constant of one or more "support structures" maintaining the position of the pixel plate away from the electrostatically charged plate. One traditional approach for controlling the gap distance is to apply a continuous control voltage to the electrodes, where the control voltage is increased to decrease the gap distance, and vice-versa. However, precise gap distance control may be affected by several factors, including variations in the operating temperatures experienced by the DLD, the voltage applied to the DLD, material variations between support structures and other system variations.

BRIEF DESCRIPTION OF THE DRAWINGS

The accompanying drawings illustrate various embodiments of the present apparatus and method and are a part of the specification. The illustrated embodiments are merely examples of the present apparatus and method and do not limit the scope of the disclosure.

Throughout the drawings, identical reference numbers designate similar, but not necessarily identical, elements.

DETAILED DESCRIPTION

A feedback-control circuit for color calibration of a diffraction light device includes at least one diffractive light device (DLD) having a gap distance defined by opposing plates, at least one sensor configured to convert light modulated by the DLD device into a light signal indicative of the gap, a controller configured to calculate a voltage correction value based on a difference between the gap as indicated by the light signal and a designer-specified gap value and being further configured to apply a corrected voltage corresponding to the voltage correction value to the DLD device.

The calibration information reflects process and system variations that may cause the assumed gap value to vary from the designer-specified gap value. The corrected voltage adjusts the assumed gap value, allowing it to substantially correspond to the designer-specified gap value. The corrected voltage and the designer-specified gap values are then stored, such that they may be accessible to an operational circuit. The operational circuit controls DLD devices or a human visible array. These DLD devices are adjusted by accessing the stored corrected voltage and designer-specified gap values. As a result, the feedback control circuit continuously adjusts the DLD devices of a human visible array to account for process and system variations.

As used herein and in the appended claims, the terms "diffractive light device" and "DLD" are meant to be broadly understood as any device or structure that selectively produces color by controlling the gap size between a reflective surface and one or more charge plates by balancing two forces: electro-static attraction based on voltage and charge on the plates, and a spring constant of one or more "support structures" supporting the reflective surface. Additionally, the term "Micro-Electro Mechanical System" or "MEMS" is meant to be understood broadly as describing any very small (micro) mechanical device that may be constructed on a single semiconductor chip and which may be fabricated, for example, using integrated circuit (IC) batch-processing techniques.

In the following description, for purposes of explanation, numerous specific details are set forth in order to provide a thorough understanding of the present method and apparatus. It will be apparent, however, to one skilled in the art that the present method and apparatus may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Exemplary Structure

Figure 1:
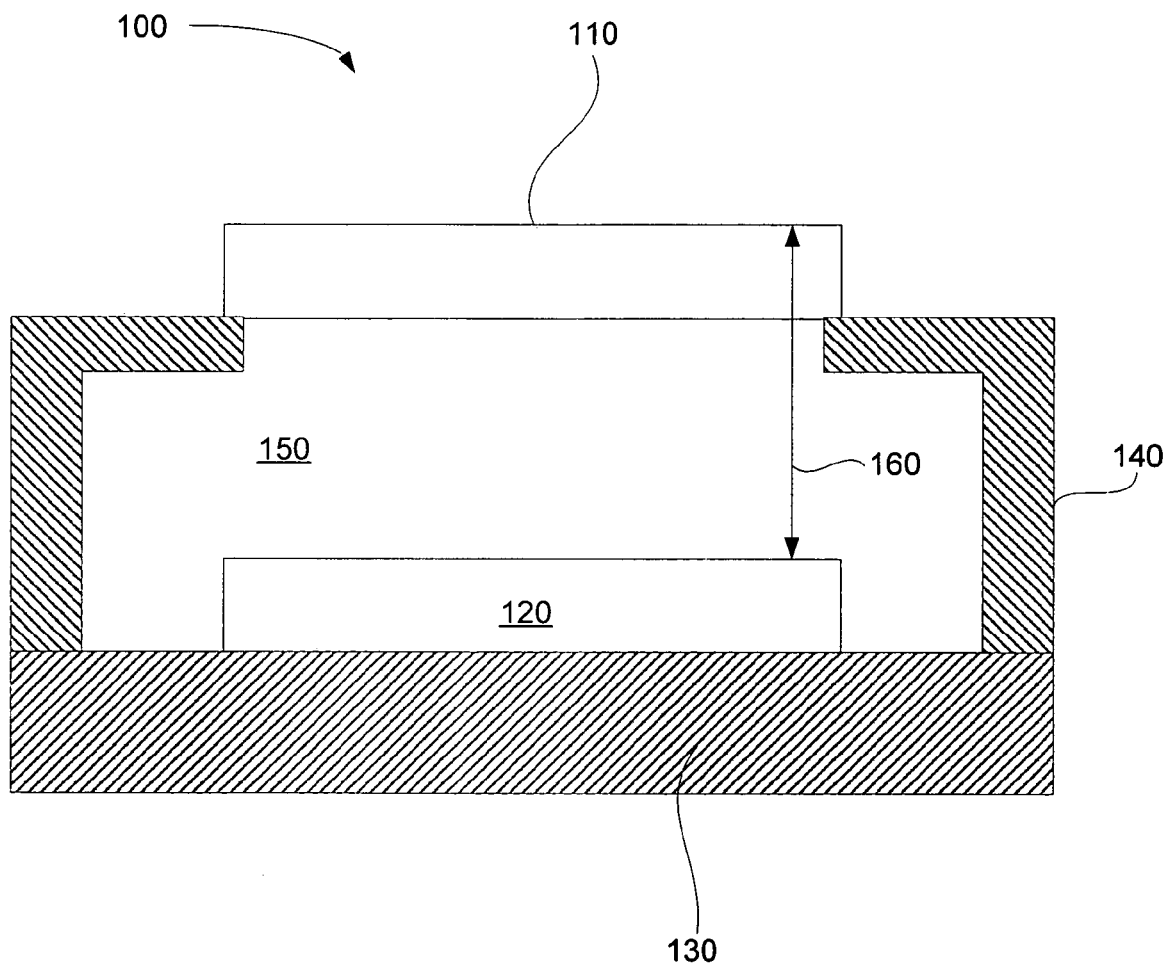
FIG. 1 illustrates a diffractive light device (DLD) according to one exemplary embodiment.

FIG. 1 is a diagram illustrating an exemplary embodiment of a diffraction light device (DLD device) (100). In the exemplary embodiment, the DLD device (100) displays, at least partially, a pixel of a displayable image. The DLD device (100) includes a top reflector (110), a bottom reflector (120), a support structure (130), and a spring mechanism (140). A resonant optical cavity (150) is defined between the reflectors (110, 120). Thus, the two reflectors (110, 120) are separated by a variable gap distance (160). The top reflector (110) may be semi-transparent or semi-reflective, with the bottom reflector (120) being highly or completely reflective. The spring mechanism (140) may be any suitable flexible material, such as a polymer, that has linear or non-linear spring functionality.

The optical cavity (150) can be adjusted to select a visible wavelength at a particular intensity using optical interference. Depending on the configuration of DLD device (100), the optical cavity (150) can either reflect or transmit the wavelength at the desired intensity. That is, the optical cavity (150) can be reflective or transmissive in nature. No light is generated by the optical cavity (150). Accordingly, the DLD device (100) relies on ambient light or other external sources of light. The visible wavelength transmitted by the optical cavity (150) and its intensity are dependent on the gap distance (160) between the top and bottom reflectors (110, 120). Accordingly, the optical cavity (150) can be tuned to a desired wavelength at a desired intensity by controlling the gap distance (160)

The support structure (130) and the spring mechanism (140) allow the gap distance (160) to vary when an appropriate amount of charge has been stored on the reflectors (110, 120), such that a desired wavelength at a desired intensity is selected. Several factors may affect the value of the variable gap distance (160) such that it is not at its intended value. Examples of such factors may include a variation in the temperature of the DLD device and physical characteristics of the reflectors (110, 120). More specifically, as the DLD device (100) heats up, the support structure (130) may be more easily deformed. In these circumstances, the force between the reflectors (110, 120) would push the reflectors (110, 120) to a variable gap distance (160) smaller than that intended. Further, manufacturing variations may result in reflectors (110, 120) of varying sizes. Accordingly, varying sizes of the reflectors (110, 120) may also contribute to deviance between an intended variable gap distance and the actual variable gap distance (160).

Figure 2:
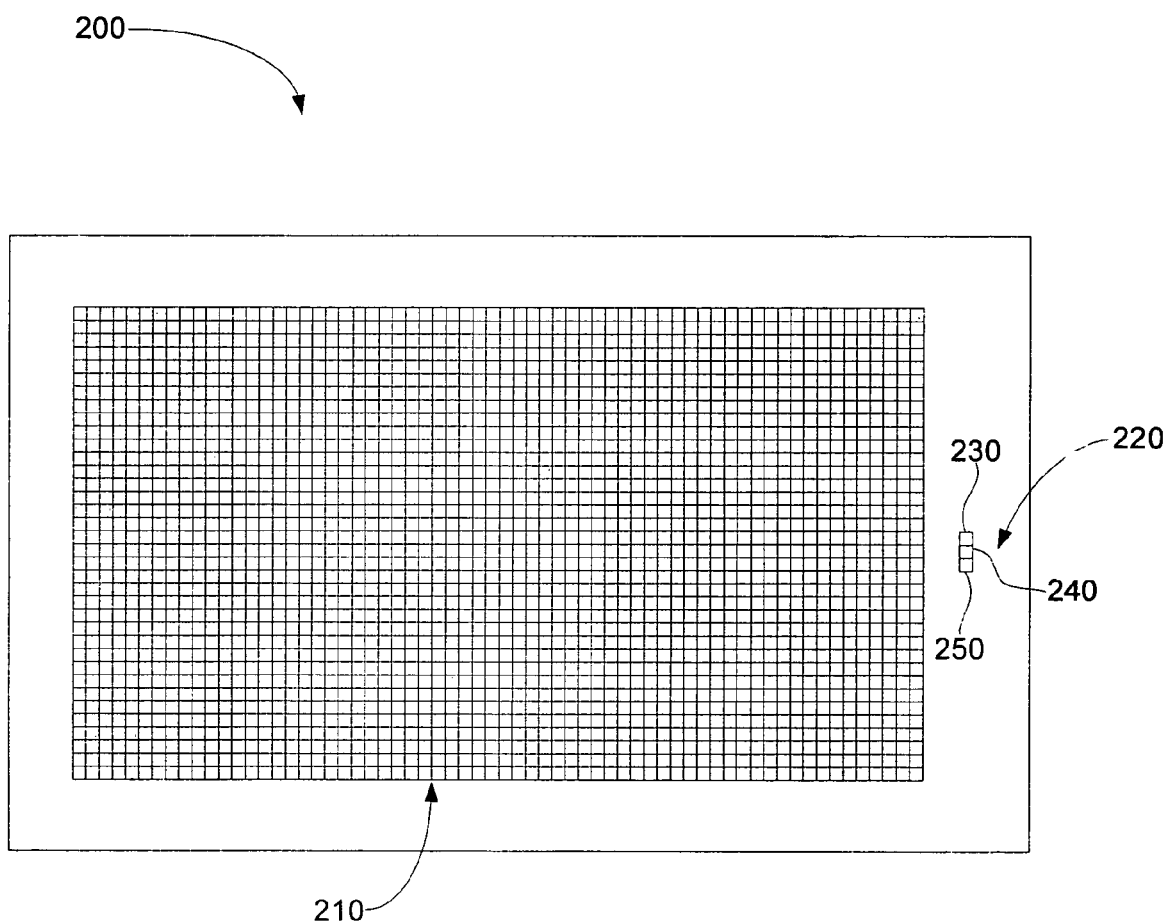
FIG. 2 illustrates DLD die according to one exemplary embodiment.

FIG. 2 illustrates a DLD die (200) which generally includes a human visible array (210) and a calibration array (220). The human visible array (210) is the array of individual DLD devices. The individual DLD devices form pixels which may be used to produce an image perceived by a human viewer. The calibration array (220) is a smaller array of DLD devices which are substantially the same size as the individual pixels used by the human visible array. Further, the human visible array (210) and the calibration array (220) are both coupled to the same voltage source. The DLD devices of the calibration array (220) may include a red pixel (230), a green pixel (240) and a blue pixel (250) that are offset from the human visible array (210). Further, four or more pixels may be used in a four or greater number color system. Red Green and Blue are used for ease of illustration only, as color combinations are known.

When the DLD die (200) is operated, each of the pixels of both the human visible array (210) and the calibration array (220) selectively filter light generated by a light generation assembly. Light from the human visible array (210) is projected through an opening in a frame or housing such that it may be perceived by a human viewer. Light generated by the calibration array (220) is projected onto a photodiode, disposed on the frame or housing, and is thus not perceived by a viewer. As will be discussed in more detail below, the light generated by the calibration arrays is used by a calibration feedback-control circuit to calibrate the voltage used in the human visible array to generate the desired human visible colors in this array. The feedback from measuring the color of the pixels (230, 240 and 250) corrects the gap distance such that the actual variable gap distance (160, FIG. 1) correlates to the intended gap distance.

As previously discussed, the calibration array (220) is separate from the human visible array (210), although they may share a common voltage source. This separation maximizes the amount of light generated by the human visible array (210) while allowing color gap values to be updated by substantially continuous operation of a calibration feedback-control circuit, as will be discussed in more detail below.

Exemplary Implementation and Operation

Figure 3:
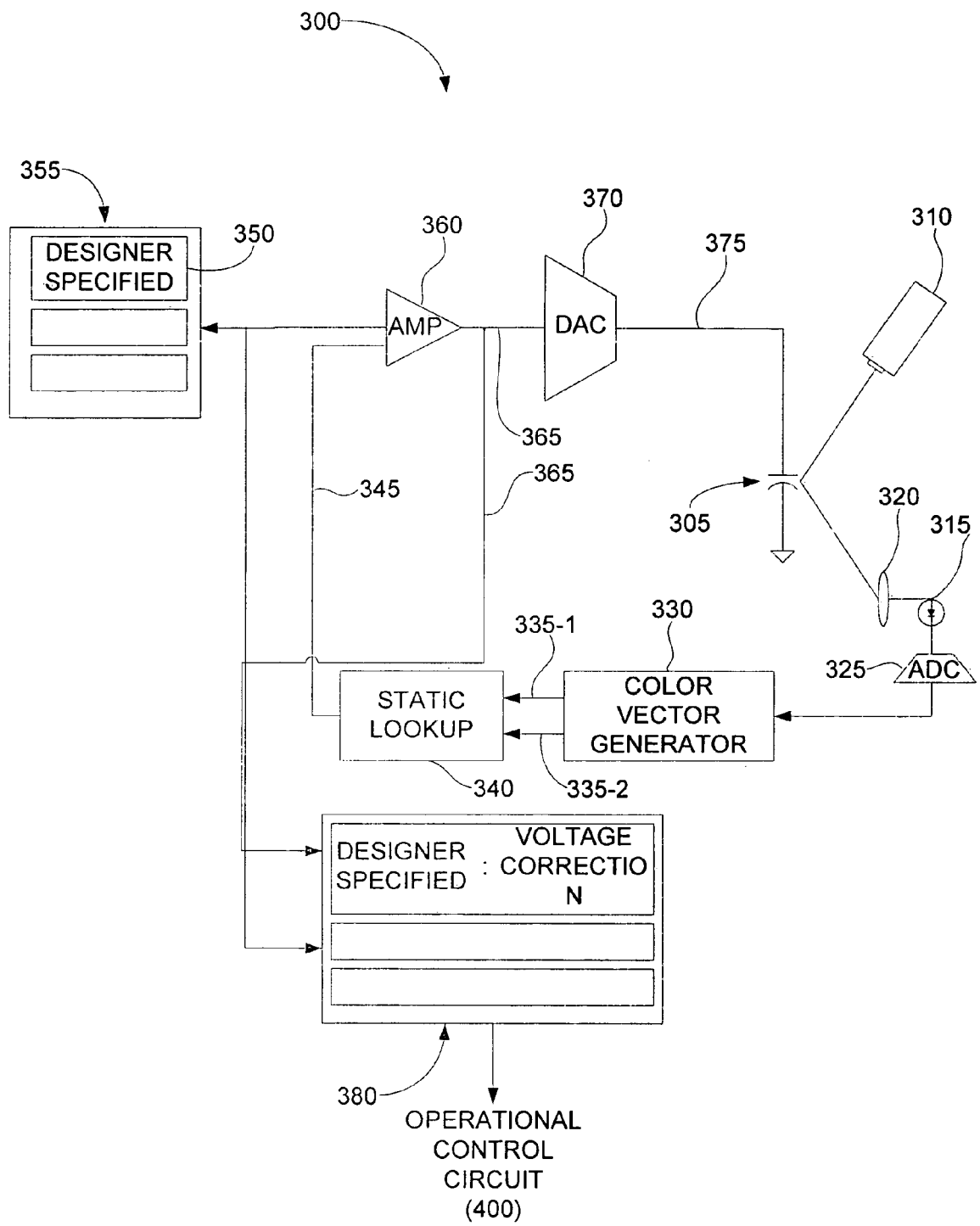
FIG. 3 illustrates a calibration feedback-control circuit according to one exemplary embodiment.

FIG. 3 illustrates an exemplary calibration feedback-control circuit (300). The feedback-control circuit (300) continuously adjusts the amount of voltage applied to a DLD device (305) to allow the assumed gap value of the DLD device (305) to substantially correspond to designer-specified or intended-gap values. The DLD device (305) may be part of a calibration array, such as the calibration array (220; FIG. 2) described above.

As shown in FIG. 3, a light source, such as a projector lamp (310), illuminates the DLD device (305). For ease of illustration, a single DLD device is shown (305). Any number of DLD devices may be used. For example, in FIG. 2 three DLD devices are used, which represent red, green, and blue pixels. The calibration feedback-control circuit (300) will refer to such a three color system, but for ease of reference will follow the calibration of a single DLD device (305).

Light diffracted by the DLD device (305) is passed through a color filter to illuminate a photodiode (315). In multiple color systems, each photodiode is coupled to a corresponding filter such that each photodiode has only one color projected thereon. For example, a red sensing photodiode would receive red light, a green sensing photodiode would receive green light, and a blue sensing photodiode would receive blue light. In the illustrated exemplary implementation, the DLD device is separate from a human visible array. In other implementations, light from a DLD device which is part of the human visible array may be directed out of the human visible array and onto a photodiode (315).

The light sensed by the photodiode (315) is converted to a digital signal by an analog to digital converter (ADC) (325). The signal generated by the ADC (325) is conveyed to a color-vector generator (330) which converts the signal to color vectors x' (335-1) and y' (335-2). The color vectors (335-1, 335-2) are "color only" vectors, and are separated from the intensity values of the light by the color-vector generator (330).

Color vectors x' (335-1) and y' (335-2) are then conveyed to a static lookup table (340) that converts the color vectors into assumed gap values (345). The assumed gap values (345) are values that represent the variable gap distances (160; FIG. 1) of each DLD device (305), assuming ideal manufactured geometries, temperatures and supply voltages. A specific assumed gap number preferably gives a specific color spectrum.

Each assumed gap value (345) is then compared to a corresponding designer-specified or intended-gap value (350), which resides on a specification lookup table (355). The assumed gap value (345) and the designer-specified gap value (350) are passed through an amplifier (360) that amplifies the difference by some amplification constant, K. This difference, which may be referred to as the voltage-correction value (365), is used to both correct the actual variable gap distance (160, FIG. 1) of the DLD device (305) of the calibration feedback-control circuit (300) and to update the color produced by a human visible array. Empty boxes are shown in the specification lookup table (355) to emphasize the fact that any number of designer-specified gap values may reside on the specification lookup table (355). Accordingly, any number of designer-specified gap values may be used to calibrate any number of DLD devices.

To correct the wavelength of light diffracted by the DLD device (305) of the calibration feedback-control circuit (300), the corrected voltage value is passed through a digital-to-analog converter (DAC) (370), which uses the digital signal of the corrected voltage value determine a corrected voltage (375). The corrected voltage (375), while determined using the corrected voltage value, corresponds to a total voltage to be driven onto the DLD device (305) for adjustment. Accordingly, the DAC (370) may be coupled to or include a variable voltage source configured to drive the corrected voltage (375) onto the DLD device (305). The corrected voltage (375) is then conveyed to the DLD device (305). The DLD device (305) may then be allowed to settle in response to the applied corrected voltage before the calibration feedback-control circuit (300) again begins the process of determining another corrected voltage. This process occurs continuously, such that factors that cause deviation of the actual variable gap distance are corrected.

As discussed, the calibration feedback-control circuit (300) calculates a corrected voltage value (365) to drive the assumed gap value (345) to substantially correspond to a designer-specified gap value (350). This correspondence in turn allows the actual gap distance (160; FIG. 1) to correspond to a transmitted color that is substantially the same as the intended color.

The voltage correction value (365) is calculated periodically, and may be done at a rate that is relatively slow compared to the pixel rate. For example, the correction may be calculated and the DLD gap calibrated at the rate of about one cycle per millisecond.

In the case that the difference between assumed gap value (345) and the intended-gap value is relatively small, a relatively small change in the actual gap voltage (375) will be applied to the DLD device (305). Similarly, if the difference between the actual-gap value (345) and the designer-specified gap value (350) is relatively large, a relatively large change in the corrected voltage (375) will be applied to the DLD device (305). The corrected voltage (375) may also be referred to as the actual gap voltage. Accordingly, the calibration feedback-control circuit (300) rapidly corrects the actual gap distance (160; FIG. 1).

Figure 4:
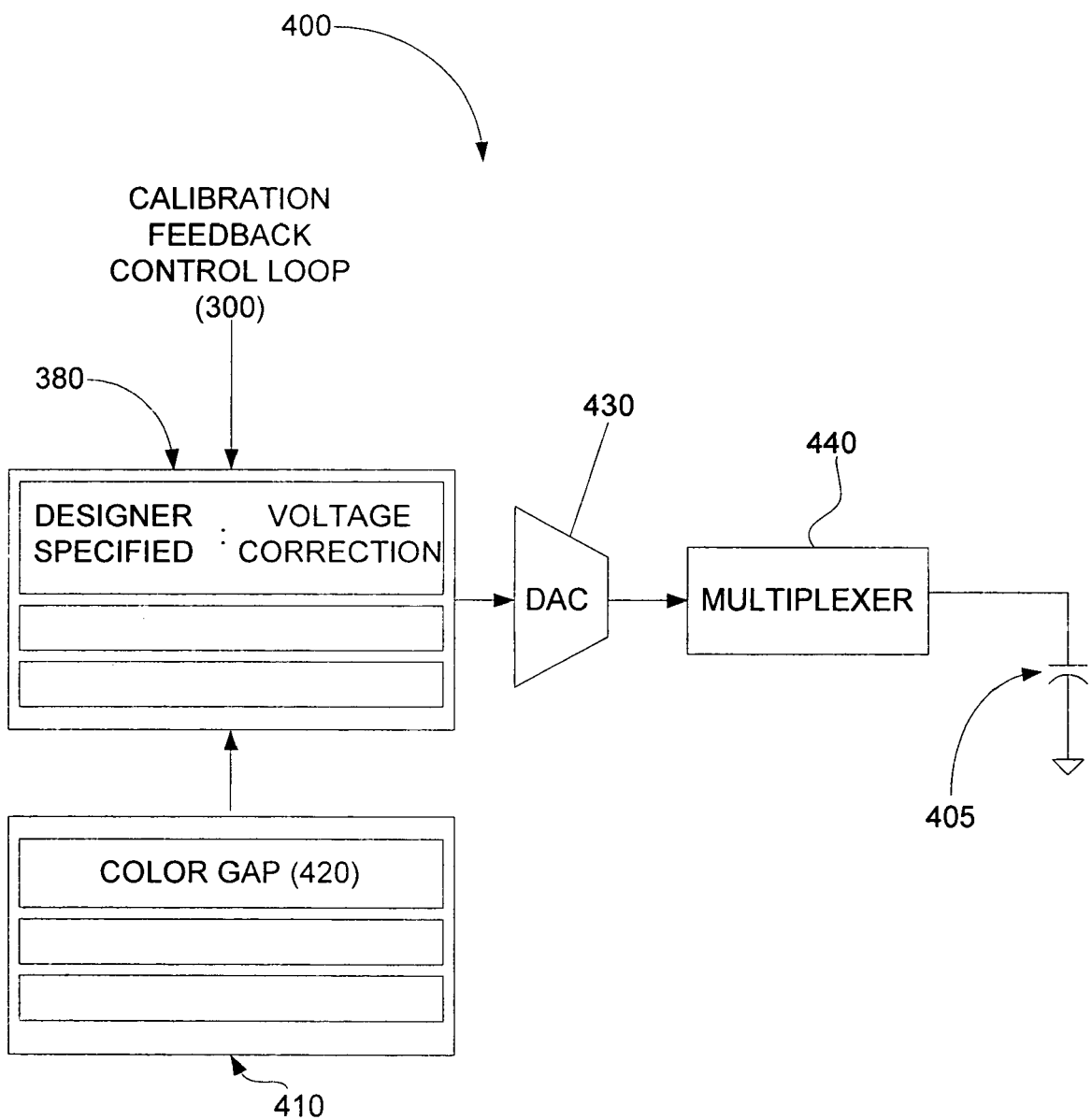
FIG. 4 illustrates an operational control circuit according to one exemplary embodiment.

The voltage correction values (365), or the amplified differences between the actual-gap value (345) and the designer-specified gap value (350), are conveyed to an operational lookup table (380). The operational lookup table (380) correlates these values, such that an operational control circuit (400; FIG. 4) may reference the operational lookup table (380), as will be discussed in more detail below. FIG. 3 has been described with reference to the calibration of a single DLD device (305). As previously discussed, any number of DLD devices may be calibrated. Each DLD device may correspond to a representative or primary pixel color produced by the system. One example of a representative pixel arrangement is a red, blue, green (RGB) system in which the primary pixel colors are red, blue, and green. Another example of a representative arrangement system may include black, red, blue, and green pixel colors.

The DAC (370), the DLD (305), the photodiode (315), and ADC (325) may be analog while the rest of the components of the calibration feedback-control loop (300) may be digital. The digital portion of the calibration feedback-control loop (300) may be operated by a relatively inexpensive microcontroller, since the speed requirements are relatively modest.

FIG. 4 illustrates an operational control circuit (400). The operational control circuit (400) may be used to control the operation of the DLD devices of a projection system, such as that described with reference to FIG. 2. As will be discussed in more detail below, the operational control circuit references the operational lookup table (380), which continuously calculates a corrected voltage. Accordingly, the DLD devices used to produce an image are continuously updated to minimize or even prevent color variation due to temperature drift, differences in voltage supply, or other system or device variations.

The operational control circuit (400) includes the operational lookup table (380) introduced with reference to FIG. 3, a digital to analog converter (430) (DAC), multiplexer (440), and an array of DLD devices. In some exemplary implementations, the DLD array may be similar to that described with reference to FIG. 2. For ease of reference, operation of a single DLD device will be discussed.

During operation, the operational control circuit (400) controls the actual gap distance of each DLD device (405) of an array of DLD devices. Each DLD device is configured to produce a different pixel of light in response to a selected voltage applied thereto. Each pixel may be configured to produce a different color.

The operational control circuit (400) includes DLD circuitry (410) that provides a number of color-voltage gap values to be summed with corresponding corrected voltage values. The number of color-voltage gap values corresponds to a color value that has been separated into the same number of color-component gaps of a color scheme, such as a red-green-blue (RGB) color scheme of the calibration feedback-control circuit (300; FIG. 3). For ease of reference, a single color-voltage gap value (420) will be discussed. The color-voltage gap value (420) is a value that would be provided to the DLD circuitry assuming no variations in the system, such as thermal effects.

As previously discussed, a designer-specified gap value and a correction-voltage value that has been calibrated to the designer-specified gap value is also stored in the operational lookup table (380). The operational control circuit (400) references the gap value on the operational lookup table (380) that corresponds to the color voltage gaps (420-1, 420-2, 420-3) supplied by the DLD circuitry (410). The voltage value stored in the operational lookup table (380), which corresponds to the desired color, and is referred to as a corrected-array value, is passed to the digital-to-analog converter (DAC) (370; FIG. 3). The operational lookup table (380) is shown with three entries for a three color system. The three entries are each for a specific color, R, G, B and they contain a number to be sent to the DAC (430) to be converted to a DLD control voltage. The DAC (430) may be the same DAC (370; FIG. 3) used in the calibration-control feedback circuit (300; FIG. 3). By using the same DAC for both calibration and operational control, variations between DACs are eliminated, thereby allowing for improved accuracy of both operations.

The DAC converts the corrected array values to corrected array voltages. The resulting corrected array voltages are transmitted to individual pixel cells of the DLD array. The temperature-compensated color voltages may then be used according to traditional DLD circuit schemes—being fed to pixel cells through a multiplexer (440) and switching field-effect transistors (FETs) to produce a desired color pattern.

Figure 5:
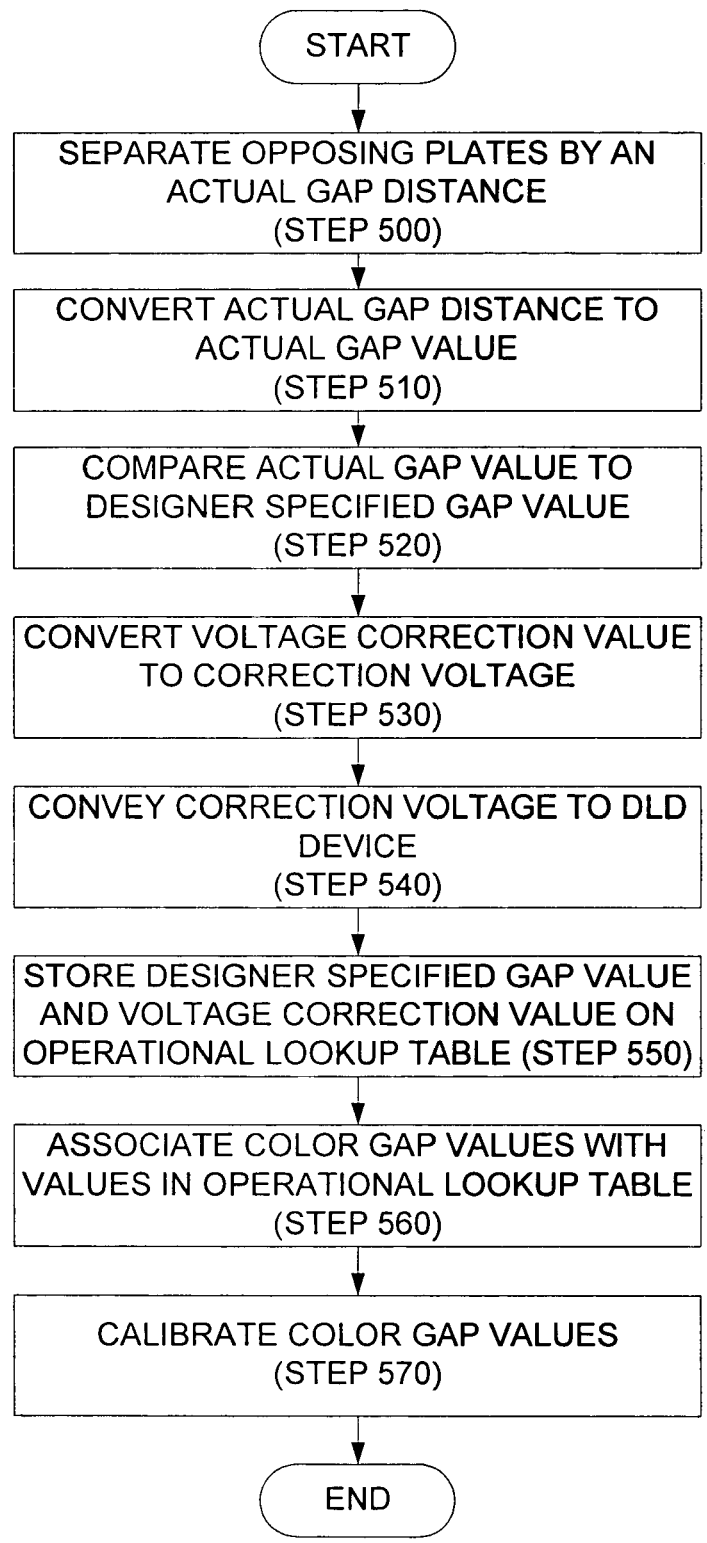
FIG. 5 is a flowchart illustrating a method of calibrating a calibration array and operating a DLD array according to one exemplary embodiment.

FIG. 5 is a flow chart illustrating a method of calibrating a DLD device. Steps 500-540 correspond to the calibration of a DLD array, such as the calibration array (220) described with reference to FIG. 2. Steps 560-570 address the operation of a human-visible array (210), such as that described with reference to FIG. 2. Step 550 deals with how the calibration of the calibration array is related to the operation of the human-visible array. Accordingly, the present method provides for a substantially continuous calibration of a human-visible array.

The method begins by moving opposing plates of the calibration DLD device so that they are separated by an actual gap distance based on a designer-specified gap value (step 500).

The designer-specified gap value corresponds to a theoretical gap distance. Several factors may cause a difference between the theoretical gap distance and the actual gap distance. As previously discussed, these factors may include temperature variations in the DLD device, manufacturing variations, differences in voltages supplies, and other system variations. The present method provides a method for calibrating the actual gap distance, such that an actual gap distance corresponds to an intended gap distance. The actual gap distance has an assumed gap value and the intended gap distance has an intended gap value.

In order to determine the difference between the actual gap distance and the designer-specified gap distance, the actual gap distance must first be converted to the assumed gap value (step 510). In order to make this conversion, light may be directed onto the DLD from a light source. Light entering the DLD device is modulated, such that light diffracted by the DLD device is of a wavelength and intensity determined by the actual gap distance and the processing, thermal, and other properties of the device.

The diffracted light is passed through at least one filter and directed onto at least one sensor. The number of filters may correspond to the number of sensors, such that each sensor is able to receive or "see" a single color. Further, the single color seen by the sensor may correspond to a representative color of a color scheme. One example of a color scheme is a red-blue-green color scheme in which a red sensor receives red light through a corresponding filter, a blue sensor receives blue light through a corresponding filter, and a green sensor receives green light through a corresponding sensor. Each of the sensors converts the light into an analog signal.

The analog signal is then converted into a digital signal. The digital signal may be used to reference a static lookup table. The reference may be done directly, by comparing the digital signal directly to a static lookup table that correlates the digital signal to an assumed gap value. The digital signal may also be passed to a color-vector generator. The color-vector generator generates color vector values corresponding to the hue of the sensed light. The color vector values are then compared to the static lookup table that correlates the color vector value to the assumed gap value.

The output of static lookup table, the assumed gap value, is then compared to the designer-specified gap value to obtain a voltage correction value (step 520). By comparing the assumed gap value and the designer-specified value, the circuit is able to determine what voltage correction value may be used to make the assumed gap value and the designer-specified gap value substantially equal.

The voltage correction value is obtained by subtracting the assumed gap value from the designer-specified gap value and multiplying the result of the subtraction by a constant, K. If the designer-specified gap value is larger than the assumed gap value and K is positive, the voltage correction value will have a negative change in value. Similarly, if the designer-specified gap is smaller than the assumed gap value and K is positive, the voltage correction value will have a positive change in value.

Once the voltage correction value, which is a number corresponding to a new DLD voltage value, has been determined it is converted to an actual DLD or corrected voltage (step 530). The DLD voltage number value may be converted to the actual or corrected voltage by passing the number through a digital-to-analog converter (DAC).

The new corrected voltage is then conveyed to the DLD device (step 540), where it is allowed to settle. The voltage residing on the DLD device is approximately inversely proportional to the actual gap distance. The introduction of the new voltage value to the DLD device causes the actual gap distance between the first and second plates to move toward the actual gap distance that gives the desired assumed gap distance from the lookup table. If the voltage correction value is calculated as described above, the voltage applied to the DLD device will decrease. Similarly, if the voltage correction value as calculated above is negative, the corrected voltage will cause an increase in the amount of voltage on the DLD device and will cause a corresponding decrease in the actual gap distance.

Once the device has settled, steps 500-540 may be continuously repeated to ensure that the actual gap distance remains substantially equal to the theoretical or designer-specified gap distances and to calibrate the actual gap distance if a difference should arise. Steps 500-540 describe the calibration of a calibration-feedback-control circuit and the calculation of a voltage correction value.

The voltage correction value and the designer-specified gap value to which it corresponds, are stored on an operational lookup table (550). The voltage correction value and the designer-specified gap value are coupled, such that referencing the designer-specified gap value also references the voltage correction value associated therewith. The operational lookup table allows an operational control circuit to associate color gap values supplied by the DLD circuitry with the designer-specified gap values and the corresponding voltage correction values that are stored on the operational lookup table (step 560). As previously discussed, the DLD devices of the calibration array are representative of the DLD devices controlled by the operational control circuit. As a result, corrected value stored on the operational lookup table may be used to adjust the color gap values provided by the DLD circuitry (step 570).

The voltage correction value stored on the operational lookup table is updated by operation of the calibration feedback-control circuit. Accordingly, by continuously or periodically updating the operational lookup table, the calibration feedback-control circuit also adjusts the color gap values associated with an operational array such as the human-visible array described with reference to FIG. 2.

The present method describes a method of using a calibration-feedback-control circuit to calibrate a calibration array and an operational control circuit to control the operation of a human-visible array. As discussed, correction values used by the operational control circuit are updated periodically as the feedback-control circuit operates, such that actual gap distances of the operational array are substantially equal to the intended gap distances, despite the influence of system variations such as temperature variation and voltage supply variations and/or the influence of manufacturing processes on component tolerances. As a result, the present method allows for the production of images having intended characteristics, despite the discussed variations.

The preceding description has been presented only to illustrate and describe the present method and apparatus. It is not intended to be exhaustive or to limit the disclosure to any precise form disclosed. Many modifications and variations are possible in light of the above teaching. It is intended that the scope of the invention be defined by the following claims.

What is claimed is:

1. A feedback-control circuit for color calibration of a diffraction light device, comprising:
   at least one diffractive light device (DLD) having a gap distance defined by opposing plates;
   at least one sensor configured to convert light modulated by said DLD device into a light signal indicative of said gap;

a controller configured to calculate a voltage correction value based on a difference between said gap as indicated by said light signal and a designer-specified gap value and being further configured to apply a corrected voltage corresponding to said voltage correction value to said DLD device;

wherein said controller further comprises a gap value converter having an analog-to-digital converter (ADC) and a static lookup table, wherein said ADC is configured to convert signals from said sensor to a digital value and wherein said lookup table is configured to output an assumed gap value based on said digital value.

2. The control circuit of claim 1, and further comprising an amplifier coupled to said static lookup table and said designer-specified gap value and being configured to output a voltage correction value by amplifying a difference between said designer-specified gap value and said actual gap value.

3. The control circuit of claim 2, further comprising a digital to analog converter coupled to said amplifier being configured to convert said voltage connection value to said corrected voltage.

4. A feedback-control circuit for color calibration of a diffraction light device, comprising:
  at least one diffractive light device (DLD) having a gap distance defined by opposing plates;
  at least one sensor configured to convert light modulated by said DLD device into a light signal indicative of said gap;
  a controller configured to calculate a voltage correction value based on a difference between said gap as indicated by said light signal and a designer-specified gap value and being further configured to apply a corrected voltage corresponding to said voltage correction value to said DLD device;
  wherein said controller further comprises an analog-to-digital converter (ADC), a color vector generator, and a static lookup table, wherein said ADC is configured to convert signals from said sensor to a digital value, wherein said color vector generator is configured to generate color vectors corresponding to said digital value, and wherein said static lookup table is configured to output an assumed gap value based on said color vectors.

5. The control circuit of claim 4, and further comprising an amplifier coupled to said static lookup table and said designer-specified gap value and being configured to output a voltage correction value by amplifying a difference between said designer-specified gap value and said assumed gap value.

6. The control circuit of claim 5, further comprising a digital to analog converter coupled to said amplifier being configured to convert said voltage correction value to said corrected voltage.

7. The control circuit of claim 5, further comprising an operational lookup table coupled to said amplifier and said designer-specified gap value and being configured to couple said designer-specified gap value and said actual gap value and store said designer-specified gap value and said actual gap value.

8. A feedback-control circuit for color calibration of a diffraction light device, comprising:
  at least first, second, and third diffractive light devices (DLD devices) having corresponding gap distances defined between opposing plates;
  a plurality of sensors optically coupled to said first, second and third DLD devices and configured to convert light modulated by said DLD devices into a plurality of light signals;
  a gap value convener configured to convert said light signals to assumed gap values correlated to said gap distances;
  a designer-specified gap value table having a plurality of designer-specified gap values stored thereon in which said designer-specified gap values correspond to said gap distances; and
  a controller configured to control said sensors, said gap value converter, and said designer-specified gap value table, and wherein said controller is configured to calculate voltage correction values based on differences between said assumed gap values and said designer-specified gap values and being further configured to apply corrected voltages corresponding to said voltage correction values to said first, second and third DLD devices.

9. The control circuit of claim 8, wherein said plurality of designer-specified gap values comprises red, blue, and green gap values.

10. The control circuit of claim 8, further comprising a fourth diffractive light device and wherein said plurality of designer-specified values comprises black, red, green, and blue specified gap values.

11. The control circuit of claim 8, wherein said gap value converter comprises a digital gap value converter.

12. The control circuit of claim 8, wherein said controller comprises a microcontroller.

13. A diffractive light device (DLD) system, comprising;
  a feedback-control circuit that includes a calibration array having a plurality of DLD devices each having a gap distance defined between opposing plates and wherein said feedback-control circuit is configured to convert light diffracted by said calibration array to assumed gap values corresponding to said gap distances and to calibrate each DLD device by using a voltage correction value based on a difference between said assumed gap value and a corresponding designer-specified gap value;
  an operational lookup table coupled to said feedback-control circuit being configured to couple said designer-specified gap values and voltage correction values and store said values thereon;
  a human visible array;
  an operational control circuit configured to control an operation of said human visible array and to reference said operational lookup table and to calibrate said human visible array by using said voltage correction values.

14. The system of claim 13, wherein said calibration array is offset from said human visible array.

15. The system of claim 13, wherein said calibration array is part of said human visible array.

16. The system of claim 13, wherein said plurality of DLD devices of said calibration array is configured to generate a red, blue, and green color scheme.

17. The system of claim 14, wherein said plurality of DLD devices of said calibration array is configured to generate a black, red, blue, and green color scheme.

18. A method of calibrating a diffractive light device (DLD), comprising:
  placing first and second opposing plates in a separated position defined by an actual gap distance;
  directing light onto said DLD device to modulate that light;
  converting modulated light to an assumed gap value;
  comparing said assumed gap value to a designer-specified gap value; and adjusting said assumed gap distance by a distance proportional to a difference between said assumed gap value and said designer-specified gap value.

19. The method of claim 18, wherein placing said first and second plates in said separated position occurs in response to an initial voltage corresponding to said designer-specified gap value being conveyed to said DLD device.

20. The method of claim 18, wherein converting said light to an assumed gap value comprises directing said light through a color filter and onto a light sensor, converting an output of said light sensor into a digital signal, and converting said digital signal into said assumed gap value.

21. The method of claim 20, wherein converting said digital signal into said assumed gap value comprises converting said digital signal to a plurality of color vectors, and comparing said color vectors to a lookup table.

22. The method of claim 20, wherein converting said digital signal into said assumed gap value comprises comparing said digital signal to a lookup table.

23. The method of claim 20, wherein adjusting said actual gap distance comprises amplifying a difference between said assumed gap value and said designer-specified gap value to obtain a voltage correction value, and applying a corrected voltage based on said voltage correction value to said DLD device.

24. The method of claim 23, further comprising correlating and storing said designer-specified gap value and said voltage correction value on an operational lookup table.

25. The method of claim 18, wherein said method is carried on continuously.

26. A method of calibrating a DLD array, comprising:
calibrating a calibration array by operating a calibration feedback-control circuit by placing opposing plates of a plurality of DLD devices in separated positions defined by actual gap distances, directing light onto said DLD devices to diffract light, converting said diffracted light to an assumed gap value, comparing said variable gap value to a designer-specified gap value to obtain a voltage correction values, applying a corrected voltages to said DLD devices based on said voltage correction values, and storing and correlating said voltage correction values and said designer-specified gap values on an operational lookup table;

providing a plurality of color gap values corresponding to a human visible array, and
calibrating said color gap values by referencing said operational lookup table to obtain corrected array values.

27. The method of claim 26, and further comprising converting said corrected array values to corrected array voltages and conveying said color gap voltages to said human visible array.

28. The method of claim 27, wherein said voltage correction value is converted to said corrected voltage by a digital to analog converter and corrected array values are converted to said corrected array voltage by the same digital to analog converter.

29. The method of claim 27, wherein said color gap voltages are conveyed to said human visible array through the use of a multiplexer.

30. The method of claim 26, wherein said calibration feedback-control circuit is operated continuously to update said operational lookup table.

31. A DLD system, comprising:
means for diffraction light based on an actual gap distance;
means for convening detected light values to assumed gap values;
means for comparing said assumed gap values to designer-specified gap values; and
means for adjusting said actual gap distance to minimize the distance between said assumed gap values and said designer-specified gap values.

32. The system of claim 31, and further comprising means for storing said designer-specified gap and for storing a voltage correction value based on a difference between said designer-specified gap value and said assumed gap value.

33. The system of claim 32, and further comprising means for converting said voltage correction value to a correction value.

34. The system of claim 32, and further comprising means for adjusting a human visible array based on values stored in said means for storing said designer-specified gap and for storing said voltage correction value.

* * * * *